(12) United States Patent
Berne et al.

(10) Patent No.: US 11,364,846 B2
(45) Date of Patent: Jun. 21, 2022

(54) SIDE MIRROR ASSEMBLY FOR A GROUND VEHICLE

(71) Applicant: Volvo Truck Corporation, Gothenburg (SE)

(72) Inventors: Nicolas Berne, Heyrieux (FR); Won Chol Yeom, La Mulatiere (FR); Olivier Hermann, Saint Maurice sur Dargoire (FR)

(73) Assignee: Volvo Truck Corporation, Gothenburg (SE)

( * ) Notice: Subject to any disclaimer, the term of this patent is extended or adjusted under 35 U.S.C. 154(b) by 106 days.

(21) Appl. No.: 16/959,386

(22) PCT Filed: Jan. 5, 2018

(86) PCT No.: PCT/IB2018/000107
§ 371 (c)(1),
(2) Date: Jun. 30, 2020

(87) PCT Pub. No.: WO2019/135097
PCT Pub. Date: Jul. 11, 2019

(65) Prior Publication Data
US 2021/0053492 A1 Feb. 25, 2021

(51) Int. Cl.
 *B60R 1/06* (2006.01)
 *B60R 1/12* (2006.01)
(52) U.S. Cl.
 CPC .............. *B60R 1/0612* (2013.01); *B60R 1/12* (2013.01); *B60R 2001/1284* (2013.01)
(58) Field of Classification Search
 CPC ....... B60R 1/006; B60R 1/007; B60R 1/0605; B60R 1/0612; B60R 1/12
(Continued)

(56) References Cited

U.S. PATENT DOCUMENTS

| 4,156,557 A | 5/1979 | Skewis |
| 4,267,494 A * | 5/1981 | Matsuoka ............ G05B 19/351 |
| | | 180/326 |

(Continued)

FOREIGN PATENT DOCUMENTS

| DE | 3839322 A1 | 11/1988 |
| DE | 4019234 A1 | 12/1991 |

(Continued)

OTHER PUBLICATIONS

International Search Report and Written Opinion for International application No. PCT/IB2018/000107, dated Jun. 4, 2018, 10 pages.

*Primary Examiner* — Ricky D Shafer
(74) *Attorney, Agent, or Firm* — Withrow & Terranova, PLLC (57) ABSTRACT

The invention relates to a side mirror assembly (1) for a ground vehicle, the side mirror assembly (1) comprising two mirrors (5, 6) distributed parallel to a main axis (Z12) of the side mirror assembly (1), and both configured to be secured to the ground vehicle. The side mirror assembly (1) comprises a spacer actuator (20) for moving the two mirrors (5, 6) relative to each other, between a primary position, wherein the mirrors (5, 6) are at a first distance from each other along the main axis (Z12), and a secondary position, wherein the mirrors (5, 6) are at a second distance (Zd2) from each other along the main axis (Z12), the second distance (Zd2) being greater than the first distance. At least when the mirrors (5, 6) are in the secondary position, at least one empty see-through opening (22, 24) is provided along the main axis (Z12), between the mirrors (5, 6), so that a user may see beyond the side mirror assembly (1) through said at least one see-through opening (22, 24).

16 Claims, 3 Drawing Sheets

(58) Field of Classification Search
USPC .................................. 359/841, 855, 864, 877
See application file for complete search history.

(56) References Cited

U.S. PATENT DOCUMENTS

| | | | | |
|---|---|---|---|---|
| 4,558,930 | A * | 12/1985 | Deedreek | G02B 7/1827 248/480 |
| 4,727,302 | A * | 2/1988 | Mizuta | B60R 1/025 318/466 |
| 4,804,257 | A * | 2/1989 | Schmidt | B60R 1/0605 248/479 |
| 5,886,838 | A * | 3/1999 | Kuramoto | B60R 1/07 359/841 |
| 6,398,375 | B1 * | 6/2002 | Englander | B60R 1/0605 359/864 |
| 6,962,422 | B1 * | 11/2005 | Englander | B60R 1/0605 248/478 |
| 7,287,867 | B2 * | 10/2007 | Wellington | B60R 1/078 359/841 |
| 7,360,908 | B1 * | 4/2008 | Duroux | B60R 1/074 359/841 |
| 7,407,298 | B2 * | 8/2008 | Onuki | B60R 1/074 359/843 |
| 7,571,041 | B2 * | 8/2009 | Lee | B60R 1/025 359/877 |
| 8,285,457 | B1 | 10/2012 | Askew | |
| 9,010,946 | B1 * | 4/2015 | Setnor | G02B 7/182 359/843 |
| 10,953,801 | B2 * | 3/2021 | Berne | B60R 1/0605 |
| 2002/0163743 | A1 * | 11/2002 | Lang | B60R 1/0617 359/841 |
| 2006/0181790 | A1 * | 8/2006 | Jones | B60R 1/025 359/877 |
| 2007/0263301 | A1 * | 11/2007 | Agrest | B60R 1/025 359/843 |
| 2010/0039722 | A1 * | 2/2010 | Lee | B60R 1/00 701/49 |
| 2010/0046104 | A1 * | 2/2010 | Rimae | B60R 1/025 359/877 |
| 2012/0092781 | A1 * | 4/2012 | Sap | B60R 1/0605 359/841 |

FOREIGN PATENT DOCUMENTS

FR          2415559 A2    8/1979
JP          S56120430 A    9/1981

* cited by examiner

SIDE MIRROR ASSEMBLY FOR A GROUND VEHICLE

This application is a 35 USC 371 national phase filing of International Application No. PCT/IB2018/000107, filed Jan. 5, 2018, the disclosure of which is incorporated herein by reference in its entirety.

The present invention concerns a side mirror assembly for a ground vehicle and preferably to a ground vehicle comprising such a side mirror assembly.

The present invention is preferably applicable to the domain of rear-view devices equipped on vehicles, preferably positioned externally on said vehicles, for allowing a driver of the vehicle to perceive the environment of the vehicle for maneuvering.

A side view mirror is generally found on the exterior of most motor vehicles for the purpose of assisting the driver to see areas behind and by the sides of the vehicle, in particular outside of the driver's field of view. Typically, a side view mirror is mounted on each side of the front doors of the vehicle, normally at the A-pillar of the vehicle, located at the front of the window of the front door of the vehicle.

For safety and maneuverability reasons, vehicles over a certain size/weight are often required to bear a pair of two different rear view mirrors at each side. Each pair comprises a main mirror (often designated as "Class II") and a wide angle mirror (often designated as "Class IV").

DE102009036259 A1 discloses an external rear view mirror of a truck, the external rear view mirror comprising a main rear view mirror and a wide-angle mirror, of which orientation may be adjusted electronically.

This known external rear view mirror constitutes an obstacle to the field of view of the driver, since the two mirrors are housed in an opaque front lid. However, the presence of a front lid may lead to better aerodynamics at high speed.

Thus, this is an object of the invention to provide a new side mirror assembly with a plurality of mirrors, that is less obstructive to the driver's view and that is more aerodynamic, thus allowing reduced fuel consumption.

The above-mentioned object is achieved in accordance to claim 1.

In the secondary position, the side mirror assembly of the invention allows the user, who is preferably the driver or a passenger of the ground vehicle, to have a better direct view through the see-through opening of the side mirror assembly, formed by the axial spacing between the two mirrors. In the primary position, this side mirror assembly allows better aerodynamics since the see-through opening is closed, or at least of reduced size, by bringing the two mirrors closer together, thus reducing the axial spacing between them.

Further advantageous features, although optional, of the invention are defined in claims 2 to 17.

Another object of the invention is a ground vehicle as defined in claim 18.

Further advantages and advantageous features of the invention are disclosed in the following description, provided in reference to the appended drawings, solely for exemplary non-limitative purpose.

Figure 1:
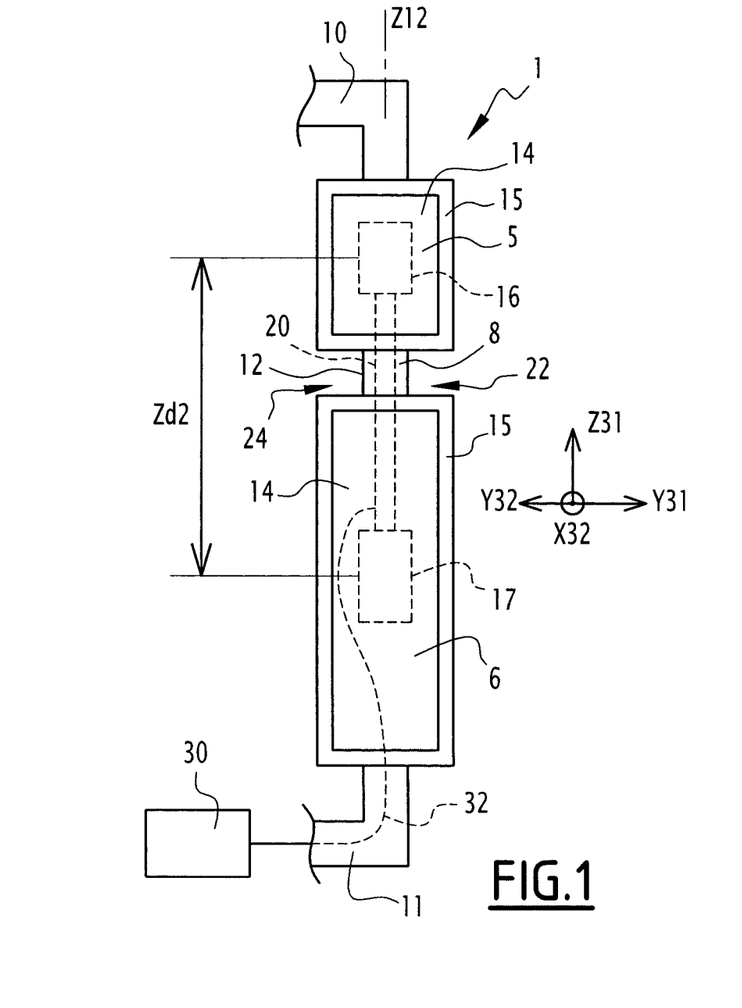
FIG. 1 and FIG. 2 are schematic plan view of a side mirror assembly according to a first exemplary embodiment of the invention, illustrated in two different configurations.
Figure 2:
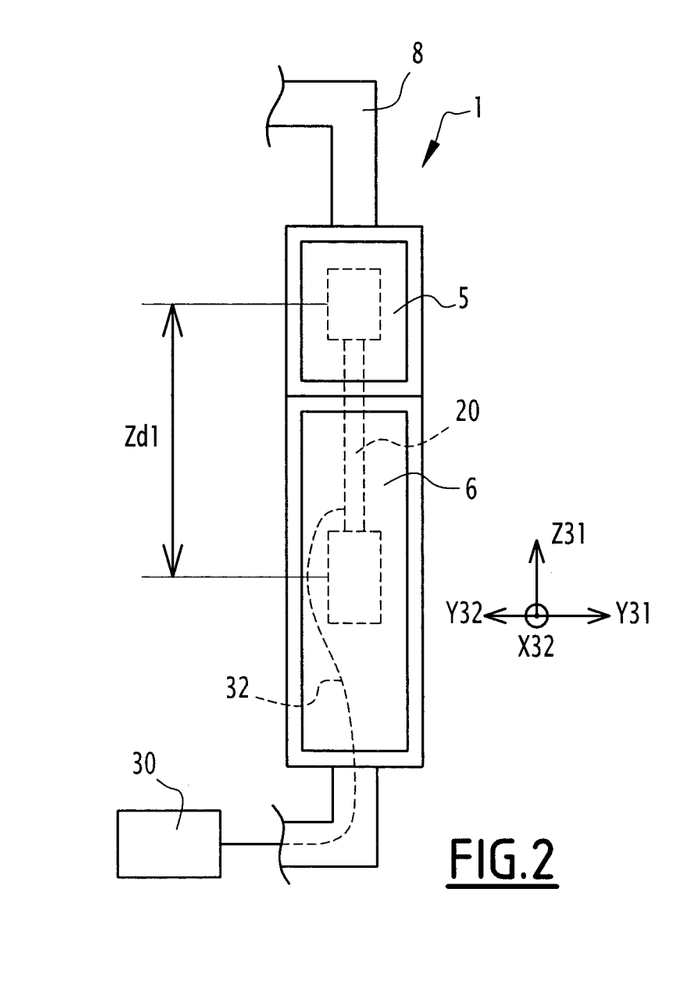
Figure 3:
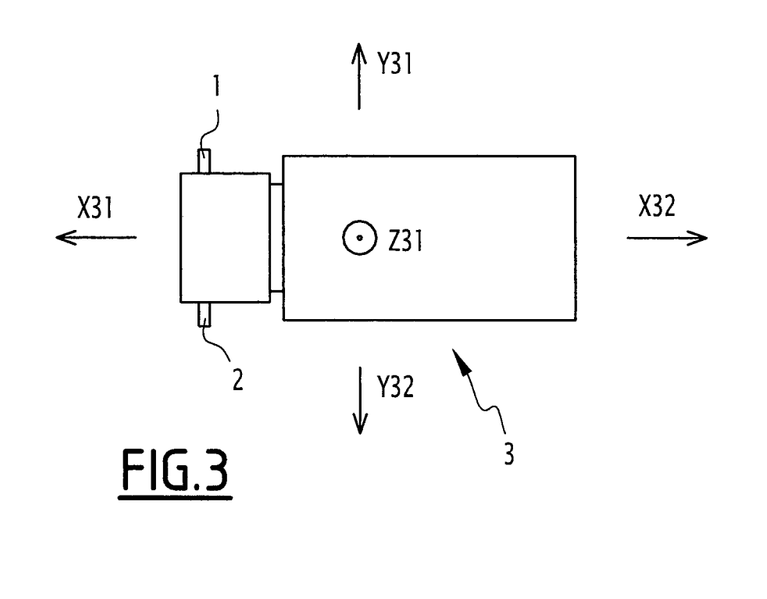
FIG. 3 is a schematic top view of a ground vehicle comprising the side mirror assembly of FIGS. 1 and 2.

FIGS. 1 and 2 show a right side mirror assembly 1 for a ground vehicle 3, illustrated in FIG. 3. The vehicle 3 is also equipped with a left side mirror assembly 2.

As visible in FIG. 3, the vehicle 3 defines spatial directions:
- a front direction X31, directed from the back to the front of the vehicle 3 and being parallel to the ground or horizontal in normal situation of usage of the vehicle 3;
- a back direction X32, opposed to the front direction X31;
- a right direction Y31, perpendicular to the direction X31 and oriented to the right relative to it, direction Y31 being parallel to the ground or horizontal in normal situation of usage of the vehicle 3;
- a left direction Y32 opposed to the right direction Y31; and
- a height direction Z31, oriented perpendicular to the directions X31 and Y31, towards the top of the vehicle 3, the direction Z31 being perpendicular to the ground or vertical in normal situation of usage of the vehicle 3.

In the present example, the vehicle 3 is a truck. In the vehicle 3, a vehicle cabin or a vehicle tractor is at the front, while a vehicle trailer is at the back. However the invention can be applied in for any ground vehicle, preferably heavy-duty vehicles, such as trucks, buses and construction vehicles and, although the invention will be described with respect to a commercial transport vehicle, it is not restricted to this particular vehicle, but may also be used in other vehicles such as refuse trucks, mixer trucks and, indeed, any other vehicles utilising at least one side mirror assembly on at least one side thereof.

By "ground vehicle", it is meant a vehicle which is configured for driving on the ground, preferably on roads, paths or fields. The vehicles concerned by the invention are preferably motor vehicles.

In the present case, the assemblies 1 and 2 are provided on the exterior of the vehicle 3 for the purpose of assisting the person driving the vehicle 3, designated as "the driver" or "the user", or a passenger of the vehicle 3, to see areas behind and to the sides of the vehicle 3. Preferably, but not exclusively, the assembly 1 is mounted at one lateral side of the front door of the vehicle 3, in this case at a right A-pillar thereof. In other words, the assembly 1 preferably protrudes in direction Y31 from the vehicle cabin. The assembly 2 is mounted at the opposite lateral side, in this case at a left A-pillar thereof. In other words, the assembly 2 preferably protrudes in direction Y32 from the vehicle cabin.

As visible in FIGS. 1 and 2, the side mirror assembly 1 comprises a mirror 5 and a mirror 6, distributed along an axis Z12 of the assembly 1. The axis Z12 is designated as "main axis". The axis Z12 is preferably parallel to direction Z31, or slightly inclined relative thereto. By "distributed along axis Z12", it is preferably meant that the mirrors 5 and 6 are aligned parallel to the axis Z12. In other words, the axis Z12 passes through both mirrors 5 and 6, preferably through their respective center of gravity.

Some embodiments in accordance to the invention may include staggered mirrors. For example, in the case of staggered mirrors, one of the mirrors is positioned in the direction X32 and/or in the direction Y31 relative to the other mirror. In the same example, the mirrors are still distributed parallel to the direction Z31 relative to each other.

The mirrors 5 and 6 are distinct and mobile relative to each other. Preferably, one of the mirrors 5 and 6 is a wide-angle mirror (class IV), preferably mirror 6, and the other is a main mirror (class II), preferably mirror 5.

Each mirror 5 and 6 comprises at least one reflector 14, to be used by the driver to see objects by reflection onto said reflector 14. Thus, the assembly 1 comprises at least two separate reflectors 14, one for each mirror 5 and 6. Preferably, the reflectors 14 are oriented towards a direction with a slight inclination relative to directions X32 and Y31. For a left assembly like assembly 2, the reflectors would be oriented towards a direction oriented with a slight inclination relative to directions X32 and Y32.

Each mirror 5 and 6 preferably comprises a respective cover part 15. The reflector 14 of the concerned mirror 5 or 6 is secured to the cover part 15, or housed within the cover part. The two cover parts 15 are separate from each other. For each mirror 5 and 6, the reflector 14 and the cover part 15 preferably form a solid mechanical unit independent from the other mirror of the assembly 1. Each cover part 15 is positioned in the direction X31 relative to the reflector 14 fixed to it.

The mirror assembly 1 further comprises a support structure 8 for supporting and securing the mirrors 5 and 6 to the body of the vehicle 3. In the present case, the support structure includes an upper arm 10, connected to the body of the vehicle 3 in the direction Y32, a lower arm 11, connected to the body of the vehicle 3 in the direction Y32, the upper arm 10 being positioned in the direction Z31 relative to the lower arm 11. The arms 10 and 11 are connected together by a linker arm 12, parallel to the axis Z12.

In the present example, the mirrors 5 and 6 are secured to the support structure 8, along axis Z12, in the direction X32 relative to the structure 8. In particular, the mirrors 5 and 6 are secured to and distributed along the arm 12, by means of their respective cover part 15. Alternatively, each or both mirrors may be secured to respective arms 10 and/or 11.

Thus, by means of the support structure 8, or by any other means, the mirrors 5 and 6 are configured to be secured to the vehicle 3.

In the embodiment of FIGS. 1 and 2, the linker arm 12 constitutes a structural element linking the mirrors 5 and 6 together along axis Z12. In this case, the structural element is preferably non-transparent or untransparent. "Untransparent" may indicate that the structural element is opaque. Alternatively, untransparent may indicate that the human eye cannot see through the structural element, although the structural element is not absolutely opaque. For example, the structural element may be made of a metallic material, or an opaque plastic material, at least on its outer surface. In other words, the view of the driver may be obstructed by the structural element. Preferably, the structural element is entirely untransparent, more preferably entirely opaque. Thus, it is advantageous that the structural element is as thin as possible for reducing view obstruction. However, the presence of such a structural element linking the two mirrors 5 and 6 is advantageous for structural resistance of the assembly 1. The non-transparency of the arm 12 can also serve aesthetic purpose, since the untransparent arm 12 may house electrical wires or all or part of the actuator 20 defined below.

The assembly 1 may comprise a plurality of linker arms similar to the arm 12, constituting the structural element.

Preferably, the covers parts 15 are untransparent, or preferably opaque.

Preferably the arms 10 and 11 are untransparent, or preferably opaque.

The assembly 1 comprises a spacer actuator 20, also designated as "main actuator". In FIGS. 1 and 2, the actuator 20 is schematically illustrated with dashed lines, since located behind the mirrors 5 and 6. The spacer actuator 20 is configured for shifting, or moving one mirror 5 or 6 relative to the other, along axis Z12. For this purpose, the actuator 20 may move both mirrors 5 and 6 relative to the support structure 8, or move only one of the mirrors 5 or 6 relative to the support structure 8 whereas the other remains fixed relative to the support structure 8. In the present example, as depicted in FIGS. 1 and 2, only the mirror 5 is moved by the actuator 20 between a primary position along axis Z12 depicted in FIG. 2, to a secondary position along axis Z12 depicted in FIG. 1, and reverse. For reaching the primary position starting from the secondary position, mirror 5 is moved down, namely in a direction opposite to the direction Z31. The movement of the mirror 5 relative to the mirror 6 is preferably a translation parallel to the axis Z31. Thus the actuator 20 may toggle the mirror 5 from the primary position to the secondary position, and from the secondary position to the primary position. The actuator 20 may optionally be configured for moving the mirror 5 to any further position along axis Z12 relative to the mirror 6.

In the primary position illustrated in FIG. 2, the mirrors 5 and 6 are at a first distance Zd1 from each other along axis Z12, whereas in the secondary position illustrated in FIG. 1, the mirrors 5 and 6 are at a second distance Zd2 from each other along axis Z12, distance Zd2 being greater than distance Zd1. In other words, mirrors 5 and 6 are closer to each other when they are in the primary position than when they are in the secondary position, parallel to axis Z12.

In the present embodiment, when the mirror 5 is in the secondary position like in FIG. 1, the mirrors 5 and 6 are spaced apart from each other along axis Z12, so that two empty see-through openings 22 and 24 are formed along the axis Z12 between the mirrors 5 and 6. "Empty" means that the openings 22 and 24 may not be filled with a solid transparent or see-through material, such as glass or transparent plastic material; the opening 22 may although be filled with air. Thus, a person, such as the driver of the vehicle 3, may see beyond the assembly 1 through the see-through opening 22 when the mirror 5 is in the secondary position. The openings 22 and 24 are preferably configured for allowing the driver to see through in direction X31.

More precisely, each opening 22 and 24 is delimited by the top of the cover part 15 of the mirror 6, by the bottom of the cover part 15 of the mirror 5, and by one of the two sides of the linker arm 12. Each opening is left open on one side, namely in direction Y31 for the opening 22 and in direction Y32 for the opening 24.

It is advantageous that the openings 22 and 24 are left free of transparent material, since it avoids dirt to build up onto such material and thus block the view. Also, it allows the assembly 1 to have a lighter and more aesthetic design.

In case additional linker arms such as the linker arm 12 are provided for the mirror assembly, more see-through openings may be defined by them.

Thus, the secondary position allows reducing the direct view obstruction of the mirror assembly 1.

In the primary position depicted in FIG. 2, the mirrors 5 and 6 are preferably abutting each other parallel to axis Z12, so that the openings 22 and 24 that were formed in the secondary position are at least partially closed, preferably completely, as this is the case in FIG. 1. For this purpose, the bottom of the mirror 5 and the top of the mirror 6 are preferably of corresponding or mating shapes, such as planar shapes for planar abutment contact.

In the primary position, since the openings 22 and 24 are of reduced size or are closed or obstructed, and the mirrors 5 and 6 are in a more compact configuration in a plane parallel to directions Y31 and Z31, the assembly 1 has better aerodynamics than in the secondary position.

Thus, preferably, the primary position is used for higher speeds driving of the vehicle 3, whereas the secondary position is used for maneuvering at slower speeds. Preferably, the actuator 20 is provided within the structure 8. In this case, at least a part of the actuator 20 is preferably integrated inside the arm 12. Preferably, the actuator 20 comprises:
- a rotary motor, preferably integrated in the arm 12 and fixed relative to the arm, said rotary motor comprising a rotor rotating coaxially with the axis Z12,
- a helical transmission, also called "screw-nut transmission", integrated in the arm 12, transforming the rotational action of the rotary motor into a translation action along axis Z12
- an actuation member fixed to the mirror 5, or to the auxiliary actuator 16, for transmitting the translation action of the helical transmission to the mirror 5.

Thus, the rotation of the rotary motor may drive the mirror 5 between the two positions by means of the helical transmission.

Alternatively to a rotary motor and a helical transmission, the actuator 20 may comprise a two-way cylinder actuator.

Depending on the type of the vehicle, it may be advantageous that the spacer actuator is electrically driven.

However, it may be preferable that the spacer actuator is pneumatically driven.

Preferably, the side mirror assembly 1 comprises a control unit 30, designated as "main control unit", configured for automatically selectively setting the mirrors 5 and 6 to the primary position and the secondary position by controlling the spacer actuator 20. The control unit 30 may be an electronic device, integrated for example in the vehicle body or in the structure 8, and including a control bus 32 for connecting the unit 30 to the actuator 20.

The control unit 30 may have a manual mode so that the driver may control the relative axial position of the mirrors 5 and 6 by means of a control panel of the control unit 30.

The control unit 30 may also have an automatic mode so as to automatically control, without intervention of the driver, the relative axial position of the mirrors 5 and 6, depending on certain conditions. More specifically, in this automatic mode, the control unit 30 is configured for automatically setting the mirrors 5 and 6 to the primary position and the secondary position depending on operating data of the vehicle 3, the operating data preferably including at least one of the following: ground vehicle speed, ground vehicle steering, and vehicle travel direction or even planned route when using a GPS device. Other operating data may be chosen depending on the application.

Preferably, the control unit 30 is configured for automatically toggling the mirrors 5 and 6 to:
- the primary position, when the mirrors are in the secondary position, if the vehicle travel speed is higher than a predetermined speed threshold value, during a first predetermined time value, and
- the secondary position, when the mirrors are in the primary position, if the ground vehicle speed is lower than the predetermined speed threshold value during a second predetermined time value.

For example, the speed threshold value is 50 km/h (kilometers per hour). For example, the first time value is 30 seconds. For example the second time value is 10 seconds.

Alternatively or additionally, the control unit 30 is configured for automatically toggling the mirrors 5 and 6 to the secondary position, when the mirrors are in the primary position, if the ground vehicle steering is higher than a predetermined threshold value.

In this case, for example, the mirrors 5 and 6 are toggled to the secondary position if the vehicle enters a roundabout or when GPS device detects the vehicle will enter a roundabout.

Alternatively or additionally, the control unit 30 is configured for automatically toggling the mirrors 5 and 6 to the secondary position, when the mirrors are in the primary position, if the ground vehicle travel direction is toggled backwards. Thus, if the vehicle 3 is maneuvering, the mirrors 5 and 6 are put to the secondary position.

Preferably, one or both mirrors 5 and 6 are each provided with an actuator, designated as "auxiliary actuator" or as "tilting actuator", for adjusting the orientation, namely tilting, of the concerned mirror relative to the support structure 8. Preferably, this tilting actuator allows precise adjustment of the orientation of the mirror depending on the driver's needs or on the situation. In other words, each auxiliary actuator is configured for tilting one of the mirrors 5 or 6 relative to the support structure 8, for adapting the orientation of the concerned mirror 5 or 6 to the current driver or situation. This tilting can be operated for example around one or two axes parallel to directions Y31 and/or Z31. In the present example, an actuator 16 is configured for adjusting the orientation of the mirror 5 and another actuator 17 is configured for adjusting the orientation of the mirror 6 in an independent manner. Preferably, the axis Z12 passes through both actuators 16 and 17. The actuators 16 and 17 are schematically illustrated in dashed lines in FIGS. 1 and 2, since located behind the mirrors 5 and 6, or integrated to the concerned mirror 5 or 6 or to the support structure 8. For example, each auxiliary actuator 16 and 17 comprises an electrically-driven or pneumatically-driven motor.

The actuators 16 and 17 are preferably controlled by the driver by means of an auxiliary control unit, which may be integrated to or separate from the control unit 30. The auxiliary control unit comprises a control panel provided inside the vehicle 3 for the driver to set the mirrors 5 and 6 to a desired orientation, the auxiliary control unit being configured for controlling the auxiliary actuators 16 and 17 under control of the control panel. The control panel of the main control unit and the control panel of the auxiliary control unit may be separate devices or may be grouped into a single device.

Preferably, the control panel of the auxiliary control unit allows the driver to set, for each mirror 5 and 6, or for one of them, a primary user-set orientation and a secondary user-set orientation. For each mirror 5 and 6, the primary user-set orientation corresponds to an orientation of the concerned mirror 5 or 6 for the primary position, while the secondary user-set orientation corresponds to an orientation of the concerned mirror 5 or 6 for the secondary position. The auxiliary control unit advantageously has a memory for memorizing these user-set orientations. The auxiliary control unit is configured to automatically, with no further intervention of the driver, set the orientation of the mirror(s) 5 and/or 6 to the primary user-set orientations, when the mirrors 5 and 6 are toggled to the primary position, and to the secondary user-set orientations, when the mirrors 5 and 6 are toggled to the secondary position, by means of the auxiliary actuators 16 and 17, based on the user-set orientations stored in the memory.

More generally, the auxiliary actuators is preferably configured to automatically set the orientation of the mirror(s) 5 and/or 6 to a primary orientation, when the mirrors 5 and 6 are toggled to the primary position, and to a secondary orientation, when the mirror 5 and 6 are toggled to the secondary position. Thus, the respective orientations of the mirrors 5 and 6 are automatically corrected for remaining in accordance with the driver's needs even when the position of the mirrors 5 and 6 is toggled between primary and secondary positions.

The assembly 2 may be of similar symmetrical structure than the assembly 1, or at least have the same features. A single control unit such as the control unit 30 may allow for control of the two assemblies 1 and 2 of the vehicle 3, in particular for their respective main and auxiliary actuators. To the contrary, the assembly 2 may be of different structure than the assembly 1.

Figure 4:
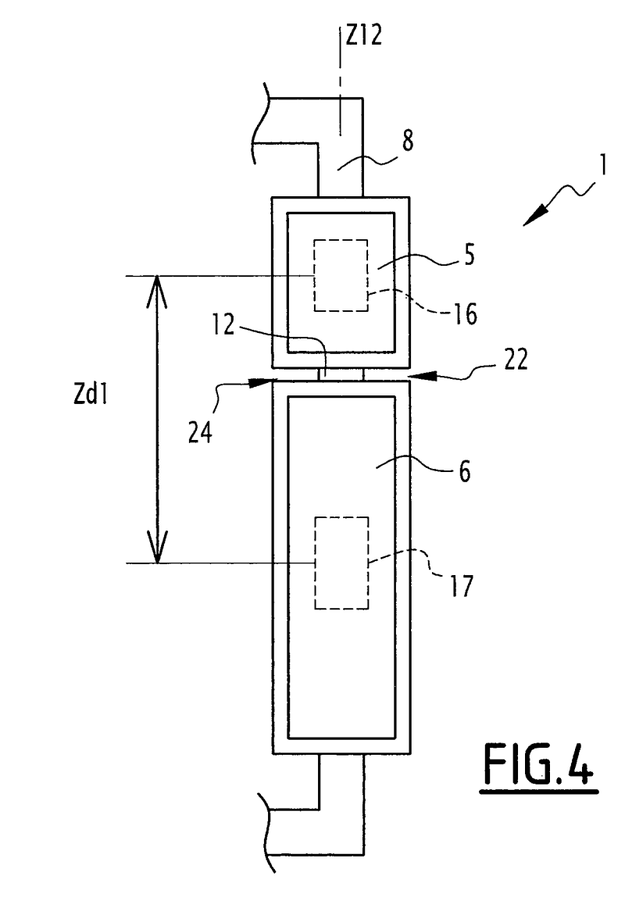
FIG. 4 is a schematic plan view of a side mirror assembly according to a second exemplary embodiment of the invention.

FIG. 4 illustrates, in combination with FIG. 1, an alternative embodiment of the assembly 1 comprising the same features as the embodiment of combined FIGS. 1 and 2, although in the assembly 1 of FIG. 4, mirror 5 is fixed relative to the structure 8 along axis X12 and mirror 6 is moved relative to the structure 8 by the spacer actuator. In the case of FIG. 4, both mirrors 5 and 6 may still be tilted by means of the actuators 16 and 17. According to this embodiment, the mirror 6 is moved up in direction Z31 for reaching the primary position depicted in FIG. 4. In the embodiment, the primary position preferably involves that the openings 22 and 24 are still formed, since the mirrors 5 and 6 are close to each other but not abutting each other. However, the openings 22 and 24 are much smaller in the primary position than in the secondary position, since the axial spacing between the mirrors 5 and 6 is reduced.

Figures 5, 6, 7:
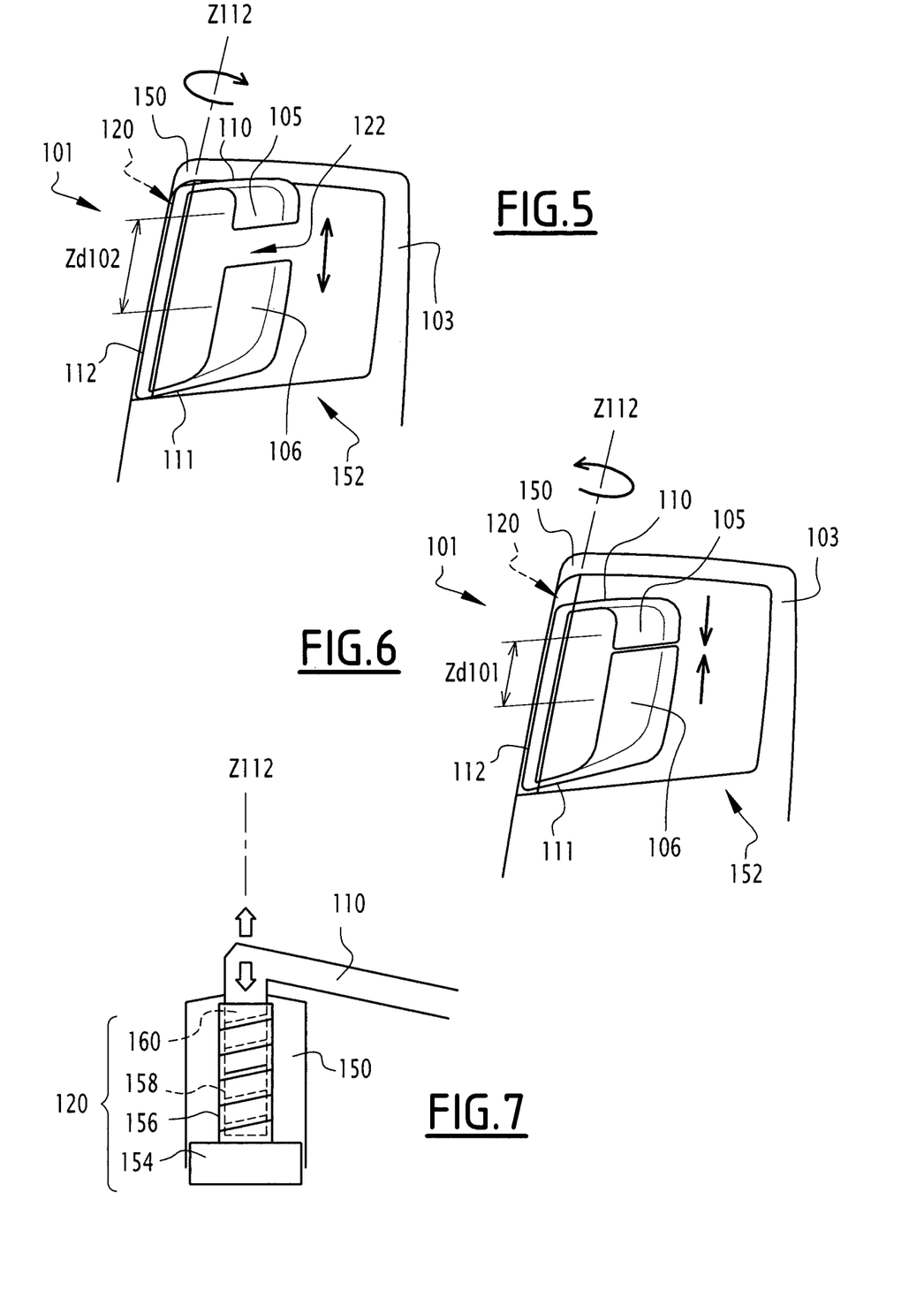
FIG. 5 and FIG. 6 are schematic perspective view of a side mirror assembly according to a third exemplary embodiment of the invention, illustrated in two different configurations.
FIG. 7 is a schematic view of a detail of the side mirror assembly of FIGS. 5 and 6.

FIGS. 5, 6 and 7 illustrate another embodiment of a side mirror assembly 101 in accordance to the invention, comprising two mirrors 105 and 106 distributed along an axis Z112. Each mirror 105 and 106 is secured externally to a body of a ground vehicle 103, more precisely to a window frame 150 of a driver's door 152. For this purpose, the assembly 101 comprises an upper arm 110, securing the mirror 105 to the window frame 150 and a lower arm 111 securing the mirror 106 to the window frame 150, in particular to the A-pillar 112 thereof.

As illustrated in FIG. 7, the assembly 101 comprises a spacer actuator 120 which is completely integrated to the A-pillar of the window frame 150. In this case, the A-pillar is preferably untransparent, more preferably opaque, for hiding the spacer actuator 120 therein.

Preferably, the actuator 120 comprises a rotary motor 154 including a rotor 156, configured for rotating parallel or coaxial with axis Z112. The actuator 120 further comprises a helical transmission 158 linking the rotation of the rotor 156 to a translation, along axis Z112, of the arm 110, and thus, of the mirror 105. In this case, a part 160 of the arm 110, also integrated to the window frame 150, constitutes an actuation member of the actuator 120. Thus, the actuator 120 may move the mirror 105 relative to the mirror 106, while mirror 106 remains fixed relative to the frame 150, for setting said mirror 105 to:

a primary position, illustrated in FIG. 6, wherein the mirror 105 and the mirror 106 are at a distance Zd101 from each other along the axis Z112;

a secondary position, illustrated in FIG. 5, wherein the mirror 105 and the mirror 106 are at a distance Zd102 from each other along the axis Z112, the distance Zd102 being greater than the distance Zd101.

Alternatively, both mirrors 105 and 106 may be moved at the same time by the actuator 120, or by separate respective spacer actuators, relative to the frame 150 and relative to each other, between a respective primary position and a respective secondary position of the mirrors 105 and 106.

In an alternative embodiment, a part of the actuator 120 such as the actuation member or the rotary motor, can be positioned partially or totally elsewhere than in the window frame 150.

For the embodiment of FIGS. 5 to 7, in the primary position, the mirrors 105 and 106 are axially abutting each other so that no axial gap is defined therebetween.

In the secondary position, an empty see-though opening 122 is defined between the mirrors 105 and 106, along an axis crossing said mirrors 105 and 106, in this case parallel to axis Z112. In this embodiment of FIGS. 5 to 7, the mirrors 105 and 106 are linked together only by the window frame 150, in particular via the A-pillar 112. The A-pillar 112 therefore plays the role of the linker arm, so in this embodiment the linker arm is not provided along an axis merged with the longitudinal axis of mirrors 105 and 106. Thus, the see-through opening 122 is only delimited by the mirrors 105 and 106, defining an axial gap between them, constituting said opening 122. As visible in FIG. 5, the axial gap 122 is preferably open all around an axis parallel to axis Z112 crossing mirrors 105 and 106. In other words, a person may see through the assembly through the opening 122 from any point of view at 360° around the axis crossing mirrors 105 and 106, no obstacle being interposed between the mirrors 105 and 106. The view obstruction of the driver is consequently highly reduced.

In an alternative embodiment, the gap 122 may be left open also in primary position of the mirrors 105 and 106, even though of reduced size compared to the secondary position since the mirrors 105 and 106 are closer to each other.

The invention claimed is:

1. A side mirror assembly for a ground vehicle, comprising:
   two mirrors distributed parallel to a main axis of the side mirror assembly, and both configured to be secured to the ground vehicle; and
   a spacer actuator for moving the two mirrors relative to each other, between:
      a primary position, wherein the mirrors are at a first distance from each other along the main axis; and
      a secondary position, wherein the mirrors are at a second distance from each other along the main axis, the second distance being greater than the first distance; and
   wherein,
      at least when the mirrors are in the secondary position, at least one see-through opening is provided along the main axis, between the mirrors, so that a user may see beyond the side mirror assembly through the at least one see-through opening;
      the side mirror assembly comprises a main control unit configured for automatically selectively setting the mirrors to the primary position and to the secondary position by controlling the spacer actuator; and
      the main control unit is configured for;
      automatically setting the mirrors to the primary position and to the secondary position depending on at least one of ground vehicle speed, ground vehicle steering, and ground vehicle travel direction of the ground vehicle; and automatically toggling the mirrors to:

the primary position, when the mirrors are in the secondary position, if the ground vehicle speed is higher than a predetermined speed threshold value during a first predetermined time value; and the secondary position, when the mirrors are in the primary position, if the ground vehicle speed is lower than the predetermined speed threshold value during a second predetermined time value.

2. The side mirror assembly of claim 1, wherein the side mirror assembly comprises a non-transparent structural element linking the mirrors parallel to the main axis, the non-transparent structural element and the mirrors delimiting the at least one see-through opening.

3. The side mirror assembly of claim 2, wherein the non-transparent structural element integrates at least a part of the spacer actuator.

4. The side mirror assembly of claim 1, wherein, at least when the mirrors are in the secondary position, the at least one see-through opening is constituted by an axial gap between the mirrors, the axial gap being open radially all around an axis parallel to the main axis.

5. The side mirror assembly of claim 1, wherein the side mirror assembly comprises a window frame of the ground vehicle, the mirrors being secured to an A-pillar of the window frame, and the A-pillar of the window frame being non-transparent and integrating at least a part of the spacer actuator.

6. The side mirror assembly of claim 1, wherein when the mirrors are in the primary position, the mirrors are abutting each other parallel to the main axis, whereas in the secondary position, the mirrors are spaced apart from each other parallel to the main axis.

7. The side mirror assembly of claim 1, wherein the main control unit is configured for automatically toggling the mirrors to the secondary position when the mirrors are in the primary position, if the ground vehicle steering is higher than a predetermined threshold value.

8. The side mirror assembly of claim 1, wherein the main control unit is configured for automatically toggling the mirrors to the secondary position when the mirrors are in the primary position, if the ground vehicle travel direction is toggled to backwards.

9. The side mirror assembly of claim 1, further comprising at least one auxiliary actuator for adjusting orientation of at least one of the mirrors.

10. The side mirror assembly of claim 9, wherein the at least one auxiliary actuator is configured to automatically set the orientation of the at least one of the mirrors:

to a primary orientation, when the mirrors are toggled to the primary position; and to a secondary orientation, when the mirrors are toggled to the secondary position.

11. The side mirror assembly of claim 10, wherein the side mirror assembly comprises an auxiliary control unit which is configured for controlling the at least one auxiliary actuator, the auxiliary control unit comprising:

a control panel for the user to set a primary user-set orientation and a secondary user-set orientation of the at least one of the mirrors; and a memory for memorizing the primary user-set orientation and the secondary user-set orientation;

wherein the auxiliary control unit is configured to automatically set the orientation of the at least one of the mirrors to the primary user-set orientation when the mirrors are toggled to the primary position, and to the secondary user-set orientation when the mirrors are toggled to the secondary position, by means of the at least one auxiliary actuator, based on the memory.

12. The side mirror assembly of claim 1, wherein the spacer actuator comprises a rotary motor, a helical transmission, and an actuation member secured to one of the mirrors, the rotary motor being configured to drive the actuation member in a translation movement parallel to the main axis by means of the helical transmission, by rotation of the rotary motor.

13. The side mirror assembly of claim 1, wherein the spacer actuator is electrically driven.

14. The side mirror assembly of claim 1, wherein the spacer actuator is pneumatically driven.

15. A ground vehicle, comprising at least one side mirror assembly, the at least one side mirror assembly comprising:

two mirrors distributed parallel to a main axis of the at least one side mirror assembly, and both configured to be secured to the ground vehicle; and a spacer actuator for moving the two mirrors relative to each other, between:

a primary position, wherein the mirrors are at a first distance from each other along the main axis; and a secondary position, wherein the mirrors are at a second distance from each other along the main axis, the second distance being greater than the first distance;

and wherein, at least when the mirrors are in the secondary position, at least one see-through opening is provided along the main axis between the mirrors, so that a user may see beyond the at least one side mirror assembly through the at least one see-through opening;

the side mirror assembly comprises a main control unit configured for automatically selectively setting the mirrors to the primary position and to the secondary position by controlling the spacer actuator; and the main control unit is configured for;

automatically setting the mirrors to the primary position and to the secondary position depending on at least one of ground vehicle speed, ground vehicle steering, and ground vehicle travel direction of the ground vehicle; and automatically toggling the mirrors to:

the primary position, when the mirrors are in the secondary position, if the ground vehicle speed is higher than a predetermined speed threshold value during a first predetermined time value; and the secondary position, when the mirrors are in the primary position, if the ground vehicle speed is lower than the predetermined speed threshold value during a second predetermined time value.

16. A side mirror assembly for a ground vehicle, comprising:

two mirrors distributed parallel to a main axis of the side mirror assembly, and both configured to be secured to the ground vehicle; and a spacer actuator for moving the two mirrors relative to each other, between:

a primary position, wherein the mirrors are at a first distance from each other along the main axis; and a secondary position, wherein the mirrors are at a second distance from each other along the main axis, the second distance being greater than the first distance; and wherein,
at least when the mirrors are in the secondary position, at least one see-through opening is provided along the main axis, between the mirrors, so that a user may see beyond the side mirror assembly through the at least one see-through opening;
the side mirror assembly comprises a main control unit configured for automatically selectively setting the mirrors to the primary position and to the secondary position by controlling the spacer actuator; and
the main control unit is configured for:
automatically setting the mirrors to the primary position and to the secondary position depending on at least one of ground vehicle speed, ground vehicle steering, and ground vehicle travel direction of the ground vehicle; and
automatically toggling the mirrors to the secondary position when the mirrors are in the primary position, if the ground vehicle steering is higher than a predetermined threshold value.

\* \* \* \* \*